Figure 1:
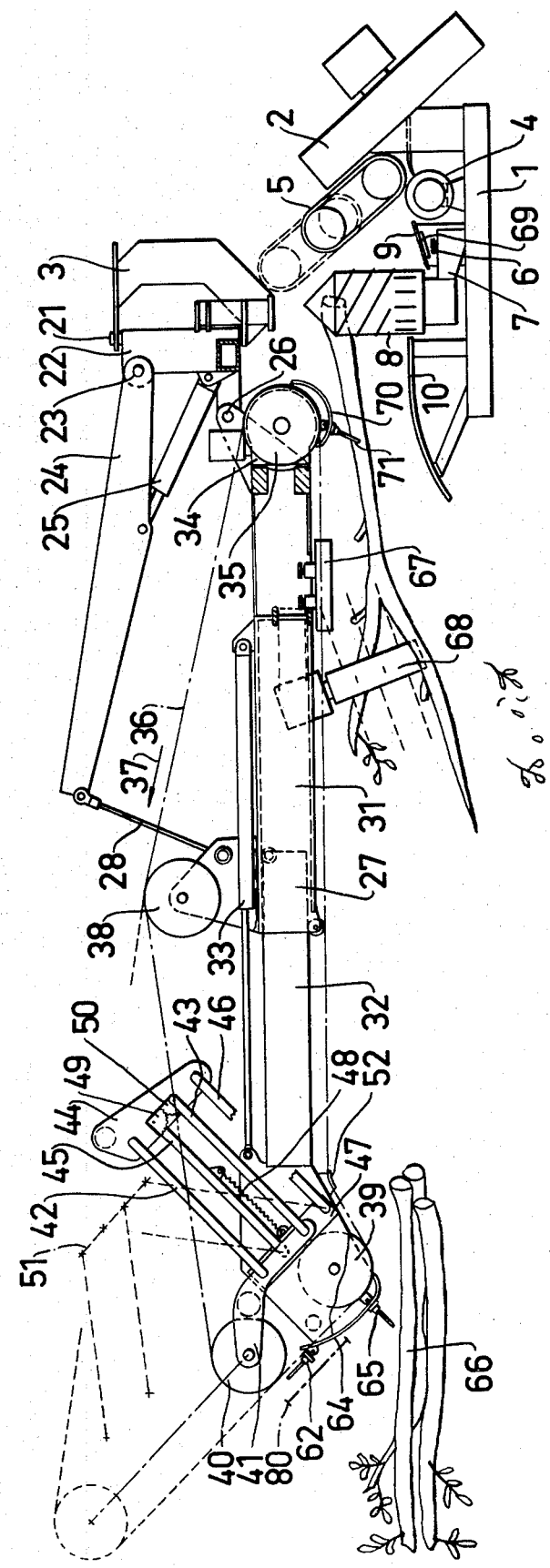

United States Patent [19]

Sall

[11] 4,361,222
[45] Nov. 30, 1982

[54] APPARATUS FOR FEEDING LONGITUDINAL HETEROGENOUS GOODS

[75] Inventor: Hans O. Sall, Garpenberg, Sweden

[73] Assignee: The Swedish University of Agricultural Sciences, Garpenberg, Sweden

[21] Appl. No.: 210,365

[22] Filed: Nov. 25, 1980

Related U.S. Application Data

[63] Continuation of Ser. No. 62,967, Aug. 2, 1979, abandoned, which is a continuation of Ser. No. 826,953, Aug. 22, 1977, abandoned.

[30] Foreign Application Priority Data

Aug. 24, 1976 [SE] Sweden .................................. 7609353

[51] Int. Cl.$^3$ ............................................. B65G 47/86
[52] U.S. Cl. .................................. 198/519; 198/316; 198/506; 198/653; 198/694
[58] Field of Search .............. 198/315, 316, 479, 506, 198/510, 519, 653, 654, 694, 695, 696; 414/751, 753; 294/106, 118; 144/246 R, 246 A-246 G, 247, 312

[56] References Cited

U.S. PATENT DOCUMENTS

| | | | |
|---|---|---|---|
| 3,286,858 | 11/1966 | Julien | 198/653 X |
| 3,500,882 | 3/1970 | Tanguay | 144/312 X |
| 3,972,357 | 8/1976 | Neal et al. | 144/312 X |

FOREIGN PATENT DOCUMENTS

| | | | |
|---|---|---|---|
| 1170872 | 5/1964 | Fed. Rep. of Germany | 198/653 |
| 476983 | 11/1975 | U.S.S.R. | 198/696 |

Primary Examiner—Jeffrey V. Nase
Attorney, Agent, or Firm—Kenyon & Kenyon

[57] ABSTRACT

An apparatus for feeding long tree parts piled with approximate parallelism to a processing machine having an infeed spaced from the pile for receiving the parts endwise, has an arm which is positioned at a level above the pile and so as to span the space from the pile to the machine when positioned in alignment with the parts, this arm carrying a traveling series of grapples running longitudinally along the arm, actuating devices causing the grapples to clamp the parts sequentially and pull them endwise to the infeed of the machine.

7 Claims, 4 Drawing Figures

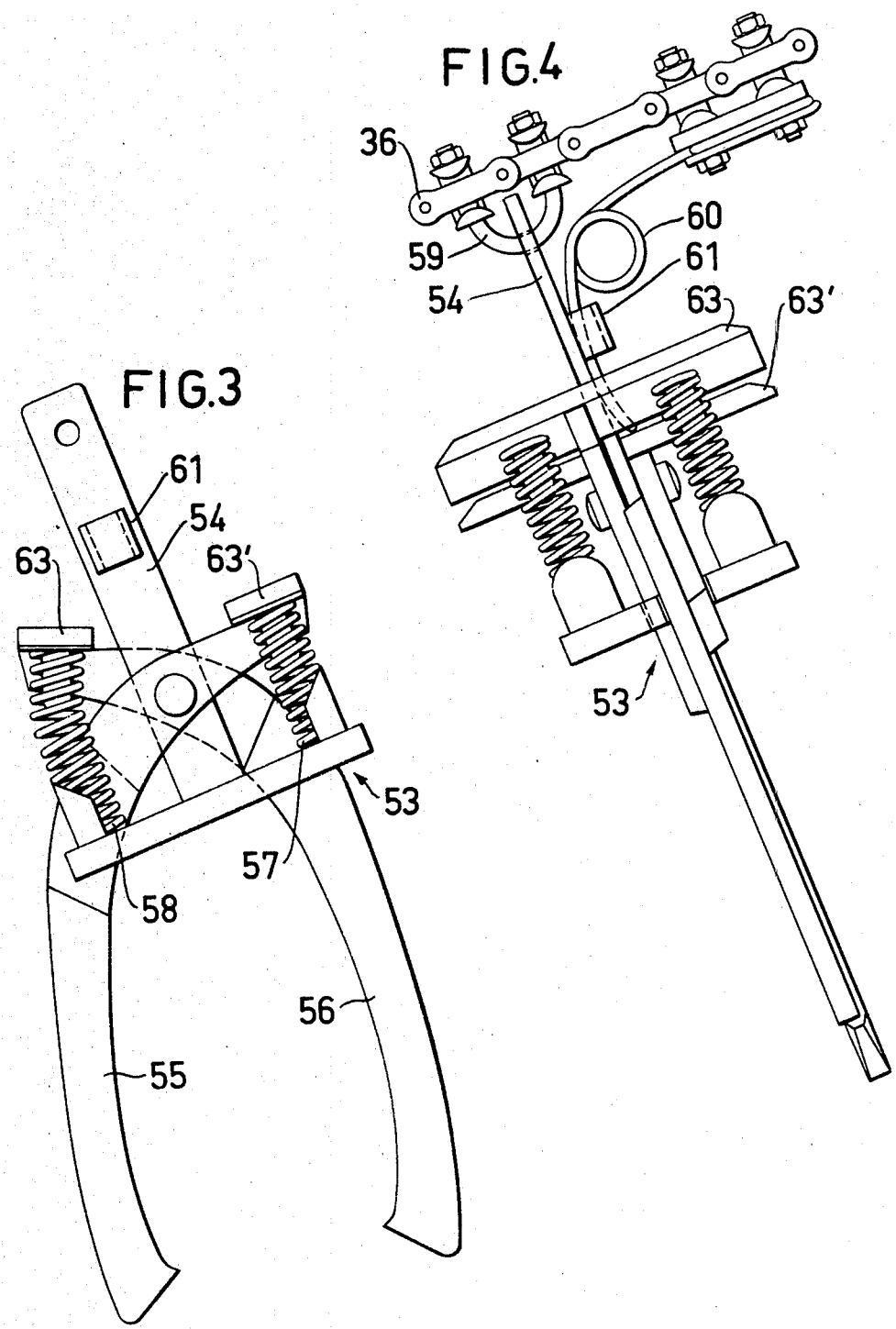

APPARATUS FOR FEEDING LONGITUDINAL HETEROGENOUS GOODS

This is a continuation of application Ser. No. 062,967 filed Aug. 2, 1979 (now abandoned) which is a continuation of application Ser. No. 826,953 filed Aug. 22, 1977 (now abandoned).

This invention relates to a method and an apparatus for feeding elongated parts or goods of varying size and appearance and which are piled with only approximate parallelism, e.g. a pile of parts of trees, such as tree branches, stems and tops to be fed from the pile to the infeed of a chipper.

In order to utilize tree parts remaining from conventional logging, the parts usually are collected and transported to a landing from which they are loaded on trucks for further transportation, or where they are piled in rough parallelism when intended to be processed by chipping or other treatment.

In the case of chipping, for example, the present situation can be described as follows. A self-powered base machine serves as the carrier of a chipper, a substantially horizontal, upwardly open chain conveyor, and a hydraulic loading crane for fetching the parts from a previously piled stack onto the conveyor. The operator from his control cabin must place heaps of the tree parts as large as possible as quickly as possible onto the continuously feeding chain conveyor.

The operator must not only, to a large extent simultaneously, control the possible six functions of the crane, but also the operation of the feed conveyor. The tree parts gravitationally rest on the conveyor and are simply heaped on the conveyor for feeding. He must prevent stopping of the parts and preferably also temporary overload of the chipper. The operator further must try to observe whether the tree parts includes impurities in the form of gravel, stone blocks or iron objects and, if such is the case, he must immediately stop the conveyor. The conveyor is capable to feed only parts which abut the conveyor satisfactorily. In order to improve the feed control, conveyor sidewalls are erected, overlying flaps are arranged to be pressed down on the parts, vertical rollers run on the side of the parts flow, overlying rollers are pressed down against the parts, etc. The control of these auxiliary units requires the operator's attention and reduces the time available for crane control.

These developments seemed to demand chippers with large feed openings, which resulted in the introduction of so-called drum chippers. They have a rectangular feed opening to the chipping drum proper and can receive larger heaps of tree parts than the usual disc chipper, which normally has a feed opening in the form of a truncated sector of a circle.

Several observations indicate that the drum chipper produces chips inferior to those produced by the disc chipper. For the chipping of relatively short tree portions, the available motor efficiency is poorly utilized, at times only to between 15 and 30 percent. The crane operator assiduously can deliver at maximum three heaps of tree parts per minute. When the chain conveyor has a speed of 24 m/minute, the parts must have a length of 8 m for rendering continuous feed possible. At a length of the tree portions of about 2 m, the chipper 75 percent of the time runs without goods.

At newer machines it was tried to design greater openings, greater grapples, higher motor efficiencies, etc. The number of crane cycles per time unit cannot be increased. The difficulty of discovering impurities is almost insuperable.

Most of the aforesaid problems should be solved by the present invention, which relates to a new method and to an apparatus for carrying out the method.

The method implies the organization of a tree parts transport to the processing unit in such a manner, that the capacity of the latter controls the feed, that the requirements on the operator's skill are reduced so that in principle only one function at a time must be controlled, that stoppages of the tree parts are prevented and impurities efficiently are separated without action by the operator.

Figure 2:
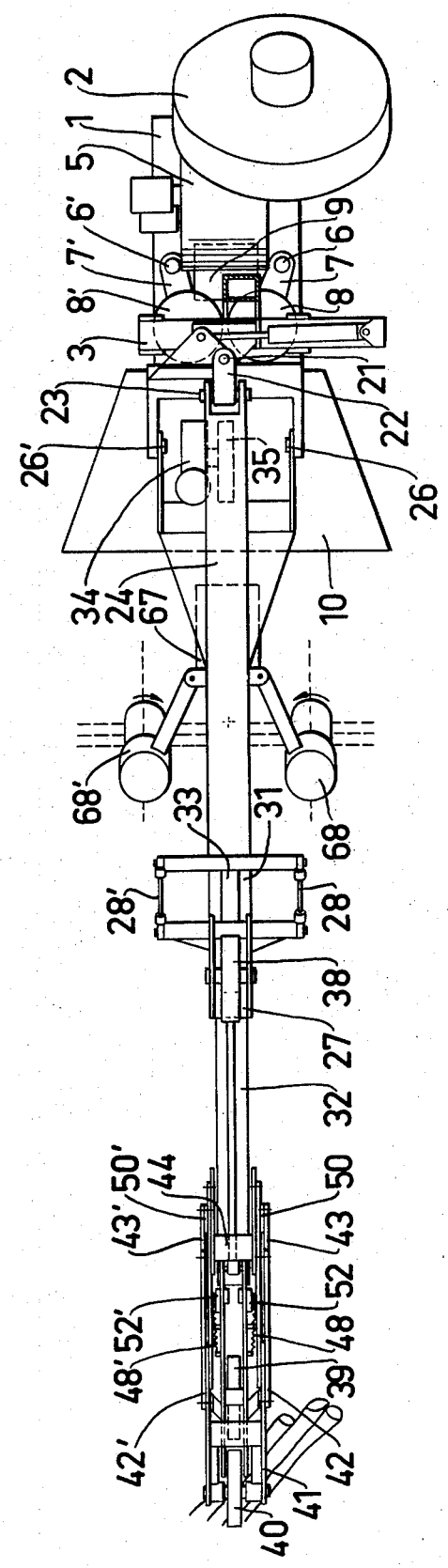

The apparatus is described here by way of example of an embodiment of the invention, with reference to the accompanying drawings, in which FIG. 1 is a lateral view of the apparatus, partially in section, FIG. 2 is a view of the apparatus seen from above, FIG. 3 and FIG. 4 show a grapple and a means for its attachment.

As shown by FIG. 1, the tree limbs or branches or parts remaining from conventional logging are in general long as compared to their diameters and are piled as approximately parallel as logging conditions permit. The parts must be fed generally endwise to the chipper, one or more at a time depending on the sizes of the parts and the permissible feeding input rate of the disc chipper.

With this understanding the new apparatus is constructed as follows:

On a lower stand 1, which preferably is supported on a vehicle, the disc chipper 2 is mounted. The stand can be supported movably for rotation in the horizontal plane and/or a vertical plane extending through the feed direction. To said stand or frame 1 an upper stand 3 is connected by means of details (not shown). The chipper is charged by means of a driven lower roll 4 and driven upper feed belt 5, which is driven synchronously with the roll 4, but is movable against spring action in its own plane to an upper position indicated by a dashed line. The roll and the belt are provided with studs or strips (not shown) for effecting a sufficient hold.

On vertical pins 6 and 6' arms 7 and 7', respectively, are movably disposed and carry vertical feed rollers 8 and 8', respectively, with associated drive means. The arms 7 and 7' are in known manner coupled together mechanically for simultaneous movement toward and away from each other. Known means are provided for adjusting the rollers, which are assumed to be driven so that their peripheral speed corresponds to that of the roll 4 and belt 5.

A guide sheet 9 between the vertical and horizontal feed units has the object of preventing irregular parts from getting caught. A catching screen 10 outside the vertical rollers has the object to catch parts, which for some reason are not moved all the way to the rollers. Such parts sooner or later will be drawn in by action of other parts fed subsequently, because the rollers 8 have a pattern of ribs with steep ascent and with such screw direction at the respective roller, that a possible skidding between the roller and a part causes the part be screwn down against the metal sheets 9 and 10, whereby at the same time the engagement with the roll 4 is increased.

Earth and gravel collected on the sheet 10 are not drawn into the machine, because there is sufficient space for their discharge between the sheets 10 and 9.

In the upper stand or frame 3, a column 22 is rotative in the horizontal plane about an axle 21. The column in its turn supports a carrying arm 24 which swings about a pivot 23, which arm by means of a cylinder-piston unit 25 is powered for swinging in the vertical plane. For movement in the horizontal plane, the column 22 can be rotated through about 20° to each side from the position shown in FIG. 2. The column, further, with all details mounted thereon can be rotated through about 90° in clockwise direction from the position shown in FIG. 2 when the stand 1 is mounted on a vehicle which travels at a right angle to the apparatus as viewed in FIG. 2 (the details include the arm portions 31–32 described below which must be positioned at least about parallel to the piled parts during operation of the apparatus), in order to facilitate the transportation of the entire installation.

The column 22 also supports the feed mechanism 27 for the parts, which is suspended pivotally at the pins 26 and 26' and swings in the vertical direction under control of the suspension wires 28 and 28', which permit the feed mechanism 27 to be lifted temporarily by external forces encountered during operation of the apparatus, without lifting of the feed mechanism carrying arm 24.

The feed mechanism 27 comprises an inner arm hollow portion 31 and an outer arm portion 32 which slides within and is supported by the first one. The change of position is effected by a cylinder-piston unit 33 connected to both arm portions so as to slide the portion 32 back and forth within the portion 31. At the inner end of the inner arm portion a driving wheel 35, supported by a driving motor unit 34, is provided to drive a sprocket chain 36 in the direction of the arrow 37 over a supporting wheel 38 mounted on the inner arm portion and two pulleys mounted on the outer arm portion. Said pulleys comprise a pulley 39 stationary mounted on the outer end of the outer arm portion, and a wheel 40 acting as a tension roller. The suspension fork 41 mounts the roller 40 and the fork is supported on two pairs of mutually parallel links 42, 42' and 43, 43', respectively, at interspaced positions from the intermediate piece 44, which saddle-like permits passage of the chain 36. The intermediate piece 44 is supported by connection with the ends of two other pairs of mutually parallel links 45, 45' and 46, 46', respectively, which at their other ends are mounted in the outer end portion 47 of the outer arm portion 32. Tension springs 48 and 48' are attached to the portion 47 and to the links 45 and 45', respectively, to tighten the chain 36 by biasing the suspension fork to swing in a direction moving the roller 40 in a direction tautening the chains. The links 45 and 45', respectively, at their ends supported in the intermediate piece 44 are fixed to tooth sectors 49 and 49', respectively, which mesh with tooth sectors 50 and 50', respectively, arranged in a corresponding way at the links 43 and 43', respectively. The arrangement of links and springs causes the suspension fork 41 of the ratchet wheel 40 to perform a rectilinear movement during the movements of the outer arm portion. After the retraction of the feed mechanism, the links and the intermediate piece assume the position indicated by dashed lines 51.

The chains 36 runs, besides over said wheels over deflection bars 52 and 52', each carrying one of the lateral links of the chain and causing the chain 36 to run on a straight span to the driving wheel 35.

On the chain, grapples 53 are attached with regular spaced relationship, which grapples as shown by FIGS. 3 and 4 each comprise a body 54, a leg 55 and a second leg 56, each actuated by a compression spring 57 and 58, respectively, whereby the grapple is resiliently held closed about a greater or smaller object, with a force which, due to the spring characteristics and geometry of the legs, is greater the greater the object is.

Owing to the design of the legs, the grapple simultaneously has the possibility of releasing the hold when the part held should get stuck or when several parts have been caught which together are too large.

The body 54 of the grapple is attached to the chain 36 by means of a yoke 59. In an adjacent link of the chain (ahead in driving direction) a spring 60 is mounted, the other end of which is inserted in a sleeve 61 formed on the body 54. Said spring 60 tends to turn the grapple in the plane of the chain (a vertical plane along the feed mechanism 27) to a folded position in parallel with the chain 36, as shown by the position of the grapple 62 in FIG. 1.

This position along the chain path is the one where the projections 63 and 63', respectively, on the rear end of the grapple legs as they are folded get into contact with the guide curves or cams 64 and 64', respectively. Said curves are connected to the fixed part of the outer arm portion 32 and have the object by their configuration to first actuate the rear portions of the projections 63 and 63' to swing the grapple outward from the chain against the force of the spring 60, and thereafter or partly simultaneously to substantially entirely open the grapple against the force of the springs 57 and 58. Owing to one guide curve being located on each side of the path of the grapple body 54, the grapple and its opened position are well defined in the lateral direction. In the position shown at 65 the grapple still is fully open and ready to grab a tree part 66 within the space covered by the opened grapple during the continued movement.

The guide curves are designed in length so as to permit the grapple to start the closing movement approximately in the position indicated by 65 when it is approaching the pile of tree parts and to be fully closed when the grapple is suspended straight down from the pulley 39. It can be seen from FIG. 1 that by control of the arm portion 32 its end portion 47 can be positioned so that full engagement with the limb or branch 66 occurs adjacent to its end portion in the direction of the feeding. Therefore, the tree part can be pulled endwise without excessive downward tipping of its forward end. Assuming that the grapple has embraced the tree branch 66, during the subsequent transport the grapple will swing on its connection 59 and assume an inclined position, the angle of which depends on the centre of gravity of the branch, its weight and skidding resistance. During the movement upward to the deflection bars 52 and 52', the branch is lifted in order to facilitate its release from the pile of tree parts.

Such a release also is facilitated if the feed mechanism is given such a lateral swing direction, that the grabbed end of the branch is lifted out from the side of the stack, as indicated in FIG. 2.

When the branch for some reason is stuck very firmly, for example clamped by other branches or frozen on the support, the hold of the grapple about a branch is released simply. The grapple's holding force depends on the form of the legs and on the force of the springs 57 and 58.

When the branch has been grabbed firmly, it is pulled endwise by the movement of the chain inward to the infeed of the chipper. The chain during its movement passes a shaker 67, which in known manner imparts to the side links of the chain a vibrating motion, which is intended to be transferred to the branch via the grapple and to shake off loose sand and the like.

The tree part further passes a whipping means comprising whip drums 68 and 68' located one on each side of the feed mechanism. The whips attached to the drums can consist in known manner of chains or of beating flexible members working less hard. The drums are driven in the directions indicated by the arrows in FIG. 2 and are movable individually toward and away from the feed mechanism, which they are caused to contact by means known per se (not shown). The contacting movement can be adjustable and preferably is controlled from the operator's seat of the machine. The whipping operation has the object primarily to remove needles and leaves from tree parts. By a harder working even small knots can be removed, whereby as experience shows also greater knots are knocked off. Due to the working direction of the whips, the material thus separated lands farther out from the machine. The whip drums are shown in the FIG. 1 with a certain inclination relative to the feed mechanism, in order that the plane of rotation of all whips entirely covers the tree parts being moved past the same. The inclination per se may be different, without thereby affecting the effect in principle. For safety reasons, a protection should be provided outside the whip drums to prevent damages by a whip possibly loosening.

To the extent the whips consist of metallic material, there is risk that a loosening whip may reach the chipper 2 and cause serious damages. In order to prevent such damages, the guide sheet 9 can consist of non-metallic material, and below the same metal-indicating means 69 of a type known per se may be located and so coupled to the control of the roll 4, belt 5, rollers 8 and 8' and feed mechanism 27, that all these means stop immediately when a piece of a metallic object actuates said metal-indicating means. The device described constitutes per se a certain safety against the feeding in of metallic impurities, which in spite of whipping and shaking may remain on the tree branch or branches being fed. At the inner end of the feed mechanism, close to the drive wheel 35, an additional pair of guide curves or cams 70 and 70' are provided which engage with the grapple, as described before, when it approaches the drive wheel 35. The curves act on the grapple in such a manner, that the grapple at first is erected positively, thereafter opened and so it remains open approximately until the grapple is in a position directly in front of the wheel 35. At the same time when the grapple disengages from the guide curves 70 and 70', and due to the spring force is again closed, the grapple is folded down by the spring 60 to a position along with the chain, as shown at 62 in FIG. 1.

When the grapple in the position shown at 71 starts releasing the part, the part normally already has entered substantially endwise between the rollers 8 and 8', which continue to transport at the same speed, if possible, as produced previously by the chain. If the tree part upon arrival at the belt 5 lies too high, it is pressed down by the belt 5 whereby a certain feed takes place. Due to screw-like strips provided on the rollers 8 and 8', the parts being fed when not being able to move tangentially are screwn downward along the rollers. This movement normally takes place as a combination of feed and transport in the axial direction, to which the belt 5 contributes. The downward contact of the belt preferably is so adjusted that, when it is not capable to press down the parts by its drivers actuating the belt, the belt is lifted to a position at maximum as high as indicated by dashed lines in FIG. 1. Thereafter the parts need not surmount any forces acting against the end.

The screw-like pattern of the rollers 8 and 8' further has the effect, that pieces which because of bumps or crookedness cannot be advanced, rapidly are moved downward between the rollers. When then a preceding piece is being advanced, driven by the roll 4 and belt 5, this piece additionally contributes to effecting the feed. When nothing ahead is being advanced, the screw-lines of the rollers 8 and 8' draw down a reluctant object to the bottom of the rollers whereby the object is tracked over the rounding of the metal sheet 10. Thereby a new possibility of turning and position changing arises which possibly results in that the rollers are capable to advance the object. In order to improve this possibility of the rollers, the pattern advantageously can be designed more aggressively or with a greater pitch at the lower portion of the rollers.

Tree parts grabbed by the grapple too close to their leading end will land on the sheet 10 after the grapple has opened. A greater or smaller part of these parts, depending on their size and shape, will be drawn in between the rollers 8 and 8' by parts fed in subsequently and, thus, are processed without needing further force.

The control of the apparatus in its entirety is characterized by the new method. Instead of inserting between landing and processing unit (chipper) a manual operation or a handling unit with manual control of each movement (crane with grapple), a train of objects has been established where the operator at each occasion only must observe that the grabbing point of the apparatus (starting point of the train) approximately lies at the point where the object is to be grabbed.

This implies in practice that the feed mechanism is caused to slowly swing over the stack of timber (or other objects) until one layer has been taken out, whereafter the next layer is swept over in the same way. The control substantially implies a control of the speed of one movement at a time. A misjudgment at maximum can result in that a grapple is operated empty, or that a piece in a layer is missed. When the landing is in such a disorder that the pieces partially are clamped, it is relatively easy to find the area where pieces easily can be pulled out. Due to the limited traction power of each grapple, the stack cannot be more disarranged by applying forces in an unsuitable manner. Due to the fact that the feed mechanism comprises a telescopic extension, the control means can be arranged logically for the only three directions of movement concerning the position of the grabbing point, viz. with respect to length, side and height.

The capacity of the chipper can be utilized optimally in a simple way by permitting the feed mechanism to pick timber as rapidly as permitted by motor effect, etc.

The invention is not restricted to the embodiment described.

The feed mechanism may have a different design which, however, must permit substantially linear material transport.

The chain tensioning can be designed in a different way.

As regards the grapple, the clamping force advantageously can be arranged adjustable by means of the exchange of springs, intermediate pieces between the springs, continuous prestressing, etc., the design of which need not be exemplified.

As regards the opening degree of the grapple at the point of grabbing, adjustment can most simply be effected by together moving the guide curves 64 and 64' closer to or farther away from the path of the chain 36.

The grapples need not necessarily have the same appearance. There may be reasons for arranging, for example, a third grapple with a greater opening and thereby to render it possible to feed several trees with large diameter in a rapid sequence. Intermediate grapples then can be imagined having their grabbing area farther down or to the side of the larger grapple. Such grouping implies that the grapples must be capable to withstand impacts against objects, about which they cannot be opened, or otherwise give way to them. This can motivate an arrangement of the guide curves 64 and 64' of resilient suspension or to use different opening mechanisms for different grapples. It also can be imagined that the object of the guide curves 64 and 64', respectively, both to fold out the grapple from non-operative position close to the chain and to open the grapple is distributed to different means. It can thereby be possible that the grapple is opened, but remains free to move laterally to a certain extent, which can be of value in connection with material having great diameter.

The spring for folding the grapple inward to non-operative position, 60, has a certain effect on the material during the transport distance of the grapple. The engagement of the grapple should hereby be improved. In view of the variation in the goods, an adjustable spring force also here may be of value.

In the Figures, the grapple delivers its load in such a point that goods, which was caught close to the end, is not safely embraced by the feed rollers 8 and 8'. This may imply that very short goods tips downward with its forward end. The rollers per se can be located closer to the discharge point of the grapple without changing the basic principles.

With respect to the discharge position of the grapple, it may be pointed out that objects with small diameter will be discharged somewhat earlier than objects with great diameter. Objects fed in later on, to the extent they drop down without directly being fed in, predictably will drag them along, at least as soon as some quantity has been accumulated on the sheet 10.

The apparatus described may concludingly be characterized as an automatically grabbing transport and feed apparatus, where the point of grabbing can be displaced with respect to length, side and height.

It is then lying close at hand to try to further reduce the requirement on control. When as mentioned above the grabbing is permitted to take place near the end of the object, it is imaginable that the closing of the grapple can take place in any point along an outer, almost horizontal position of the feed mechanism. It then is motivated that the closing is controlled by fulfilling the condition "timber in the grapple". The grapple then is opened substantially as described above and remains locked in open position by means of a pawl provided in the grapple. The grapple is moved further over the timber, and when the legs have dropped down each on one side of an object, the releasing mechanism located between the legs is actuated, so that the pawl drops down and the grapple closes like a fox-trap. The opening takes place in principle as described above. For safety reasons it may be motivated that the grapple is set first immediately before it enters the area where the load is to be taken up. This kind of controlling the closing of the grapple can be called object-actuated grabbing, distinguished from the afore-described grabbing which acts automatically in a certain point. Object-controlled grabbing can be particularly valuable in connection with goods of small diameter which is stored scattered about.

Concerning goods of great diameter it can be imagined to appear less important to catch new objects with constant frequency. It is rather more important to deliver a new object firmly grabbed at the right time and thereby to make optimum use of the capacity. This object can be achieved by modifying the apparatus as follows. Instead of grapples fixed on the chain, grapples are used which run in grooves having substantially the same extension as the chain. At a certain point, corresponding substantially to 65, the grapple can be hooked onto the chain and then follows with the same all the way until it has passed the wheel 40, where it is released and by gravity collected in a queue, the position of which is marked by the line 80. Upon a signal from the operator, the foremost one of the grapples can be dropped down from this queue to an opened and oriented position corresponding substantially to position 65 where it is stopped for the present. Upon a further signal from the operator, the grapple first is closed and then immediately hooked onto the chain, and starts the feed transport.

This control method, in addition to improving the possibilities of catching correctly and feeding at the right moment, also renders it possible to design the grapple in a simple way so that its springs normally hold the grapple open by using little force. The closing can be effected thereby that a power source provided at the feed mechanism tightens a spring built-in in the grapple which thereby closes the legs of the grapple. By varying the force in said power source, different degrees of spring prestressing, and thereby different degrees of holding force of the grapple, can be obtained. These means are not shown in the drawings, because they can be imagined constituting per se known members with pawl locking. Due to the fact that the closing force is substantially constant, irrespective of the size of the object, it is ensured that the force can be set sufficiently high for safely grabbing varying objects.

The apparatus described, which can be characterized as a manually controlled grabbing, can easily be modified to operate automatically, for temporary or permanent use. The aforesaid signals for advancing the grapple from queue position can be emitted automatically at varying intervals. The second signal starting the closing and transport operations can then also follow after an adjustable interval. It is presupposed that a manual superior control is established, by which at least the closing of the grapple can be delayed.

At the moment when the grapple has been closed about an object, and this object is to be accelerated to the speed of the chain, great forces arise in the grapple mounting, the grapple, the chain and its drive. As already mentioned, a slipping in the grapple hold implies a limitation of the forces arising in different members of the apparatus. In order to prevent caught objects from too often getting out of hold immediately after they were caught, a resilient member can be provided which permits the grapple at increasing resistance be removed a limited distance from the chain. The force of the resilient member must be sufficiently small to give way at the acceleration of heavy objects, but it must be sufficiently strong to pull these objects in to the chain after the object was started moving. Its functioning presupposes that the opening of the grapple by the guide curve is not disturbed by said member. In order to achieve that the guide curves not solely tighten the spring, which takes up the acceleration, and not open the grapple, the size of the spring force can be adjusted in a suitable way.

It may be preferable to arrange the guide curves so that each during its travel presses from one side inward against the grapple. The grapple legs, of course, and the projections are to be formed accordingly.

The technique shown, at which the grapple follows a chain after having caught an object, lies close at hand. In certain cases, for example for heavy goods, mixed sizes, heterogene and with poor parallel arrangement, it may be desirable that after the grabbing first a relatively straight upward lifting is carried out, whereafter the longitudinal transport is started. The means for effecting this may be a chain guidance of different design, comprising after the pulley 39 an almost vertical portion followed by a horizontal one. The means can be imagined be combined with most of the aforesaid alternative embodiments.

When taking objects from a stack of branchy tree portions, it can be expected that at least some smaller ones are dragged along a distance by the friction from those portions caught for being fed.

These smaller portions would drop to the ground somewhere between the stack and the catching screen 10. The portion, which has dropped down so far outward that it can be reached by normal operation of the feed mechanism, can be utilized without difficulty. In order to also include such portions which have dropped out later, a low wide chute can be provided along the inner portion 31 of the feed mechanism, which chute substantially is an extension of the catching screen 10, though as to its position follows the operations of the feed mechanism.

The chain of the feed mechanism may extend in a plane other than the shown vertical one, for example in an inclined or entirely horizontal plane. When the grapples partially run free of the chain, their path can assume a plane other than that of the chain.

The entire feed mechanism, at least for goods of moderate weight, can be designed so light-weight or balanced that it can be operated manually to the stack of objects. The drive of the chain can then be so arranged, that the feed mechanism after the grabbing of a relatively heavy object tends to swing slightly from the stack, thereby preventing that several heavy objects in sequence are taken along.

The method and the apparatus are not restricted to the embodiment shown by way of example or to the embodiments described as alternatives, because they can be varied and modified in different ways within the scope of the invention.

What I claim is:

1. An apparatus for feeding elongated parts piled with at least approximate parallelism, to a process machine having an infeed spaced from an end of the pile of parts and adapted to receive the parts endwise, said apparatus comprising an arm adapted to be positioned at a level above said pile and so as to span the space from the pile to the machine when positioned at least approximately in alignment with said parts, said arm having a pivoted inner end adjacent to said infeed and a vertically swinging outer end, an endless traveling series of interspaced grapples carried by said arm through a span running longitudinally under the arm from its outer end to its inner end, actuating means for causing the grapples to sequentially clamp one or more of said parts when over said pile so as to engage and pull the part or parts endwise to said infeed, means for causing the grapples to release the part or parts at said infeed, and means for causing said travelling series of grapples to momentarily travel in an upward direction relative to said arm substantially as soon as they are caused to clamp and to thereafter travel more directly towards said infeed.

2. The apparatus of claim 1 in which said arm comprises inner and outer portions adapted to move longitudinally relative to each other so as to permit the outer end of the outer portion to be positioned at differing locations along the length of said series of grapples running over said outer end.

3. The apparatus of claim 2 in which said grapples are carried by an endless chain running lengthwise around said inner and outer portions of said arm, and the chain has means for maintaining it under tension as said portions relatively move longitudinally.

4. The apparatus of claim 1 in which a catching screen is positioned in front of the infeed of said machine and is arranged so as to catch and hold any of said parts dropped by any one grapple before arriving at said infeed, in the path of succeeding parts being fed by succeeding grapples so as to be thereby pushed into the infeed.

5. The apparatus of claim 1 having means in front of said infeed and in the travel path of the part or parts clamped and pulled by said clamps, for agitating the part or parts so as to dislodge any loose contamination carried thereby.

6. The apparatus of claim 1 in which said clamps have resilient closing means for causing them to clamp said parts so as to permit the parts to pull free from the clamps if their lifting is abnormally impeded.

7. The apparatus of claim 6 in which means are provided for controlling downward swinging of said arm while permitting free upward swinging of the arm by lifting force caused by said grapples engaging said pile of parts.

* * * * *